Feb. 15, 1966            W. C. LAPPLE            3,235,330
RECOVERY OF PHOSPHORUS VALUES AND CEMENT
CLINKER FROM A PHOSPHATIC ORE
Filed June 20, 1962

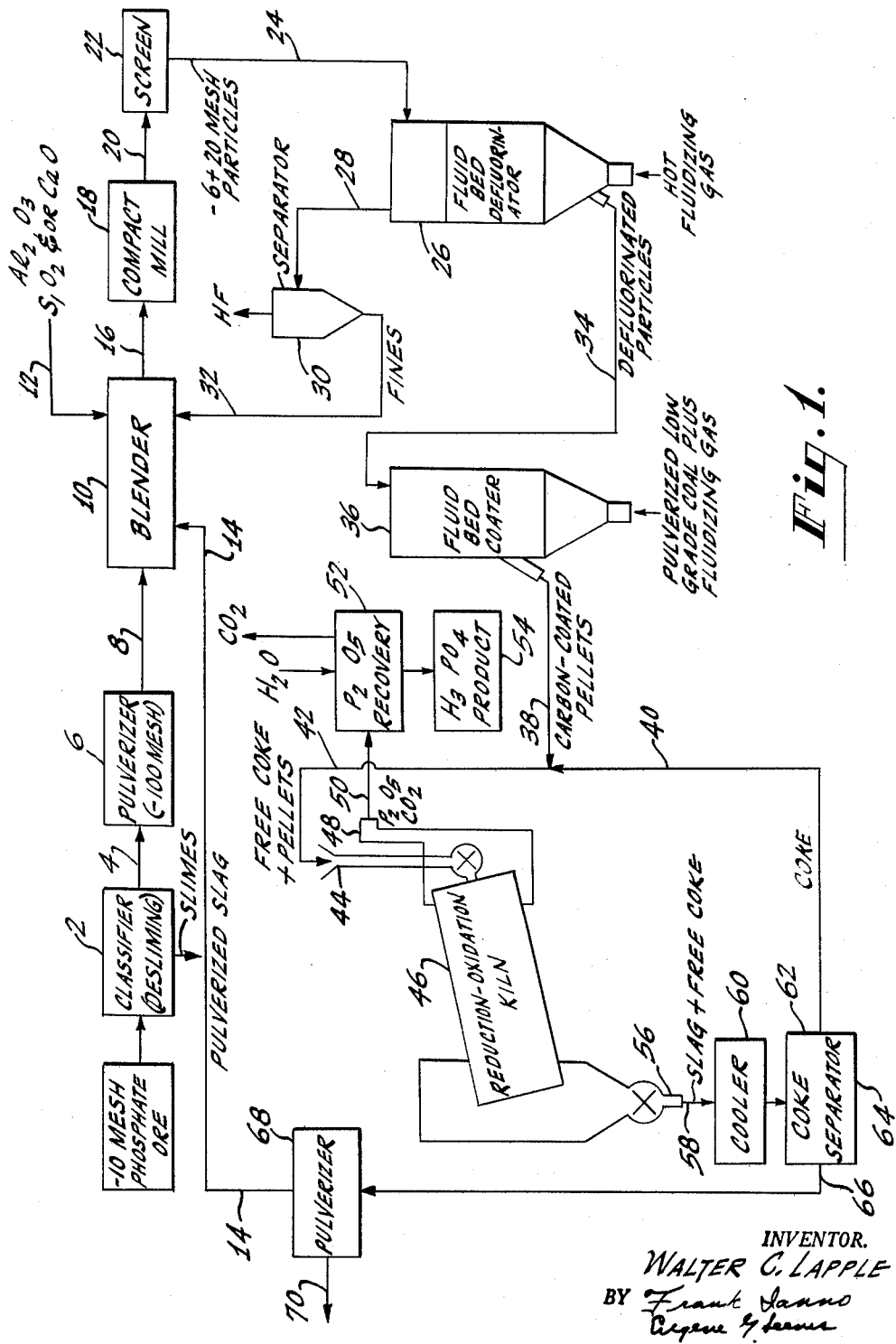

Patented Feb. 15, 1966

3,235,330
RECOVERY OF PHOSPHORUS VALUES AND CEMENT CLINKER FROM A PHOSPHATIC ORE
Walter C. Lapple, Mountainside, N.J., assignor to FMC Corporation, New York, N.Y., a corporation of Delaware
Filed June 20, 1962, Ser. No. 203,784
7 Claims. (Cl. 23—165)

This invention relates to the recovery of phosphorus values from phosphatic ores in the form of elemental phosphorus or phosphorus pentoxide ($P_2O_5$) and the simultaneous production of a tricalcium silicate by-product suitable as a cement clinker.

Commercial preparation of pure phosphorus is generally carried out in a high temperature electric furnace. In one type of electric furnace, the ore is introduced along with coke particles into the furnace and heated until phosphorus vapor is evolved. The coke serves as a reactant in the phosphate-reducing reaction and for conducting electricity through the bed. Heating is carried out by passing an electric current into the coke-bed mixture by means of conductive electrodes. The ore is heated until a molten bed composed principally of slag is formed and all of the phosphate values have been recovered. The phosphorus which is given off overhead is recovered in gaseous form while the molten slag is recovered at the base of the furnace.

The elemental phosphorus thus produced may be oxidized in various forms of furnace equipment. A particularly desirable type is described in U.S. Patent No. 2,708,620, issued to Henry S. Winnicki on May 17, 1955. In this process, phosphorus is burned with air to form $P_2O_5$ within an unlined, metal-wall tower. The $P_2O_5$ is absorbed by liquid films of phosphoric acid (aqueous solutions of $P_2O_5$) which run down the inside of the tower and accumulate in a sump at the base of the column. The accumulated acid in the sump is pumped to a heat exchanger for cooling, thereby removing the exothermic heat produced by oxidation of the phosphorus. In this type of oxidation system, the heat of combustion cannot be recovered for useful purposes.

In my co-pending application, Serial No. 203,898, filed on June 20, 1962, an improved process is taught for the direct production of phosphorus pentoxide ($P_2O_5$) in a one-step process by the reduction of a phosphate ore to elemental phosphorus and subsequent oxidation of the phosphorus to phosphorus pentoxide within the same reaction zone. In this process, excellent heat exchange is obtained since there is no barrier separating the oxidation and reduction zones.

In either of these processes, the calcium silicate which is produced is discharged as waste slag. This slag does not have any economic value and disposal of this waste product becomes a problem. An obvious use for such a slag would be as a cement clinker, but to be economically feasible, the slag itself must be useful for this purpose. Previous slags have not been useful because of two principal problems. Initially, calcium silicates useful as cement clinkers must have $CaO/SiO_2$ mole ratios of about 3:1. Phosphatic feeds containing such high $CaO/SiO_2$ mole ratios must be heated to higher temperatures than those having lower $CaO/SiO_2$ mole ratios in order to obtain phosphorus elimination. At these higher temperatures, serious sintering takes place within a rotary kiln, causing handling difficulties and hindering phosphorus elimination, along with formation of rings on the inner walls of the kiln which build up in size and eventually lead to time consuming shut downs.

In addition to the above problems, cement clinkers must be substantially free of $P_2O_5$. The amount of phosphorus impurity which can be tolerated and still maintain a cement clinker which meets specifications is no more than about 2% $P_2O_5$. Thus, very high eliminations of phosphorus from the ore must be obtained in order to produce a satisfactory cement clinker by-product.

Because of the disadvantages of operating at high $CaO/SiO_2$ mole ratios, phosphorus production is preferably carried out at lower $CaO/SiO_2$ mole ratios in order to avoid sintering, rings and poor phosphorus elimination, even though the calcium silicate produced does not have any commercial utility as a cement clinker. As a result, there is a need for a process which will permit simultaneous recovery of both the phosphorus values and a cement clinker by-product from a phosphatic ore without obtaining serious sintering or ring formation within the kiln. The principal object of the present invention is the provision of such a process.

This and other objects will be apparent from the following disclosure.

It has now been found that a phosphate-containing ore can be reduced to elemental phosphorus with the simultaneous recovery of a calcium silicate by-product suitable as a cement clinker by (a) Subjecting crushed phosphatic ore to a desliming operation to remove a fines fraction containing the colloidal particles often present as impurities in such ores and poor in phosphate values, (b) Mixing the deslimed phosphate ore with alumina (or some source of alumina), silica and/or crushed lime to produce a feed mixture having (1) A free $CaO/SiO_2$ mole ratio of above about 1.70:1 and preferably above 2.0:1,
(2) A total $CaO/SiO_2$ mole ratio of about 3:1,
(3) Lime in amounts to give a total CaO content in the final clinker product [step (h)] of about 62 to 68% by weight of the clinker, and
(4) Alumina in amounts to give a total $Al_2O_3$ content in the final clinker product [step (h)] of about 3 to 9% by weight of the clinker.

(c) Compacting the mixture to form discrete particles,
(d) Heating the compacted particles in a heating zone at temperatures of about 1050° C. to about 1500° C. in the presence of steam to remove fluoride values,
(e) Adding carbon to the defluorinated particles in at least the stoichiometric quantities necessary to reduce the phosphorus values present in the particles,
(f) Passing the carbon-containing compacted particles into a heating zone and heating said compacted particles to from about 1200° C. to 1500° C. whereby carbon monoxide and elemental phosphorus are evolved.
(g) Recovering the phosphorus thus evolved, and
(h) Recovering a calcium silicate by-product having a $CaO/SiO_2$ mole ratio of about 3:1 and suitable as a cement clinker.

The "free" $CaO/SiO_2$ ratio is defined as the mole ratio of calcium (as CaO) present, excluding calcium in the form of $Ca_3(PO_4)_2$, to $SiO_2$ present in the phosphatic feed. The "total" $CaO/SiO_2$ mole ratio is defined as the mole ratio of calcium (as CaO) present, regardless of the form in which it is present, to $SiO_2$ present in the phosphatic feed.

The inclusion of small amounts of soda ash, e.g., 3 to 8%, in the compacted particles is desirable to increase the ease of defluorination [step (d)] in the above process.

The present process prevents sintering within the heating zone, even at the high temperatures required for eliminating phosphorus from a phosphatic ore containing $CaO/SiO_2$ mole ratios of about 3:1. This is due to the combination of a desliming step which removes colloidal particles containing silica and low fusion point impurities, e.g., clay; to a defluorination step which removes the fluoride values which act as a flux during calcination; and to the regulation of the free $CaO/SiO_2$ mole ratio to above about 1.7:1 and preferably above 2.0:1. This combination of treating steps prevents fusion of the phosphatic feed within the heating zone.

In the present process, the phosphorus values can be recovered either as elemental $P_4$ or as $P_2O_5$. In the event that $P_2O_5$ is desired as the end product, the $P_4$ which is evolved from the phosphatic ore, can be oxidized to $P_2O_5$ either within the kiln or outside of the kiln. A preferred procedure is that described in my co-pending application, Serial No. 203,898, filed on June 20, 1962, in which reduction and oxidation take place in a one-step process within the kiln in the absence of a barrier between the oxidizing and reducing zones.

The preferred major piece of equipment employed in my process is a rotary kiln, chiefly because of the good heat transfers which are obtained with this apparatus. However, a travelling grate, a rotary hearth or other suitable equipment can also be employed. Where elemental phosphorus is to be recovered from the heating zone as the final product, along with the calcium silicate cement clinker, the following procedure is employed.

The phosphate ore is ground to about −10 mesh and subjected to a desliming operation. This is accomplished by washing the phosphatic feed with water in order to clarify the phosphate-containing particles from the smaller colloidal particles containing silica and low fusion point impurities. It is essential to remove 90% or more of the colloidal particles (−5 microns), but other fines, up to about 50 microns, can be removed along with the colloidal particles. The desliming operation also permits a partial control of the $CaO/SiO_2$ ratio of the feed. The desliming operation effects a qualitative separation of the phosphate ore because the phosphate values are generally found in the larger-sized particles, while low fusion point impurities are found in the smaller colloidal particles of the ore.

The deslimed phosphate ore is then dried and pulverized to about −100 mesh. This crushed ore is placed in a blender, along with alumina (or some source of alumina, e.g., bauxite ore), silica and/or lime. The calcium values otherwise supplied by lime can be added if desired through the recycle of slag (calcium silicate) from the kiln as hereinafter described, since the free $CaO/SiO_2$ mole ratio in the slag has been increased by the elimination of phosphorus previously combined with much of the CaO. In the blender, the free $CaO/SiO_2$ ratio is adjusted to about 1.7:1 and preferably above 2.0:1, while the total $CaO/SiO_2$ ratio is adjusted to about 3:1. Enough CaO and $Al_2O_3$ should be present to yield a slag containing from about 62 to 68% by weight CaO and about 3 to 9% by weight $Al_2O_3$. These amounts of CaO and $Al_2O_3$ are necessary to form an acceptable cement clinker. If desired, a small amount of soda ash, e.g., 3 to 8% by weight, may be added in the blender to facilitate the subsequent defluorination procedure. The mass from the blender is then compacted and screened to give about a −6 +20 mesh granular product. These compacted particles are then subjected to defluorination.

Defluorination is carried out by heating the compacted particles to a temperature of from 1050° C. to 1450° C. and preferably to about 1300° C. in the presence of water vapor. The preferred method of defluorinating the compacted particles is by means of a three-stage fluid bed reactor. The top stage is used for precalcination of the deslimed compacted particles at a temperature of about 1000° C. In this stage, the feed particles are preheated in a fluid bed before overflowing into the defluorination chamber in order to obtain a hard, dust-free pellet prior to defluorination. After passing through the first stage, the preheated particles are subject to defluorination in the second stage of the fluid bed reactor at a temperature of about 1300° C. The defluorinated calcine is then passed to the last stage in countercurrent contact with air to quench the calcine. The hydrogen fluoride-bearing gas stream which is discharged from the defluorinating chamber is subjected to a recovery step to remove hydrogen fluoride. The above defluorinating process is capable of removing on the order of about 99+% of the fluorine contained in the ore.

The defluorinated calcium phosphate compacted particles, which are recovered from the defluorination unit, contain primarily phosphates and silicates of calcium. The proportion of these compounds in the final compacted particles can be controlled in two ways. One direct method is by mixing varying amounts of silica and/or lime or slag from the kiln with the crushed and pulverized phosphate feed in the blender prior to defluorination. A second method is by controlling the desliming step to remove a desired proportion of silica in the phosphate feed. These two proportions can be employed separately or in combination to regulate the make-up of the feed particles. In any event, the particles coming out of the defluorinator must contain a free $CaO/SiO_2$ mole ratio of above 1.7:1 and preferably above 2.0:1 and a total $CaO/SiO_2$ mole ratio of about 3:1.

The cooled, calcined, phosphate particles which are removed from the defluorinating chamber must be impregnated with carbon to render them suitable for use as feed particles in the subsequent kiln operation. The carbonaceous material which is part of the feed particle must be present in at least stoichiometric amounts to reduce the phosphate values within the compacted particle. The carbon is most preferably added by means of a fluid bed coater. Alternate methods such as pelletizing the defluorinated particles with coal, coke or other carbonaceous material with water have not been found as desirable because the defluorinated particles do not possess good binding characteristics. Accordingly, if pelletizing is desired, an extraneous binding material other than water must be used to form acceptable pellets, which necessarily complicates the pelletizing operation.

By contrast, in the fluid bed coater, the defluorinated particles simply are passed into the fluid bed maintained at a temperature of about 500° C. to 1000° C. along with a finely ground, low-grade coal. The sensible heat of the fluidized defluorinated particles contributes to the heat requirement necessary for melting and carbonizing the coal. The coal first becomes sticky and adheres to the particle. It then carbonizes to a non-tacky, hard, adhering coating. An alternate method is to coat the defluorinated particles by cracking methane within the fluid bed reactor and to deposit the evolved carbon on the hot particles.

In either case, carbon is adherently deposited on the particle and penetrates the surface of the phosphate particle through many fissures, thereby yielding a particle in which carbon is in intimate contact with the phosphate in the particles. The carbon-treated defluorinated phosphate particles are then employed as the feed in the kiln.

The phosphate values can be recovered in the form of elemental phosphorus from the carbon-treated, defluorinated phosphate particles by placing them in suitable heating equipment such as a rotary kiln and subjecting them to temperatures of from about 1200° C. to 1500° C. At these temperatures, the carbon in the particles reacts with the phosphate ore to yield carbon monoxide and phosphorus according to the following equation:

$$Ca_3(PO_4)_2 + 5C + SiO_2 \rightarrow 3CaO \cdot SiO_2 + \tfrac{1}{2}P_4 + 5CO$$

The phosphorus is recovered in gaseous form from the top of the kiln and the calcium silicate is recovered from the slag-discharge end of the kiln. The calcium silicate slag is then pulverized. A portion is recycled to the blender while the remainder is withdrawn as clinker byproduct suitable for producing cement.

In the event the phosphorus values are to be recovered in the form of $P_2O_5$, it is preferred that the $P_2O_5$ be formed by my direct, one-step process. In this preferred process, the feed enters the kiln as a mixture of carbon treated defluorinated phosphate particles (produced in the manner described above), preferably in the form of pellets, along with "free" coke. The term, "free" coke, as employed in the specification, refers to coke which is not combined with the compacted particles in any manner and which is free to rotate in the kiln independently of the compacted particles. The compacted particles are introduced into the kiln along with the free coke in a free coke to feed particle ratio sufficient to maintain the compacted particles submerged beneath the surface of the free-coke bed. In pilot units, free coke to feed particle ratios of 4:1 are suitable; lower ratios on the order of 1:1 could be feasible in commercial size, scaled-up kilns. In general, the bed, comprising the feed particles and free coke, may occupy 35% to 40% of the kiln volume. The compacted particles must be substantially smaller than the free-coke particles when employing a rotary kiln so that they remain submerged within the free-coke mass during the rotation of the kiln. However, when employing non-tumbling equipment, such as a moving grate or pallet, the free-coke particles can be larger or smaller than the compacted particles because the compacted particles can be positioned under the free-coke bed during the bed make-up.

The compacted particles which have been defluorinated and carbon treated are introduced along with the coke into the feed end section of the kiln and heated to reaction temperatures by the transfer of heat, as hereinafter described, from the combustion of both elemental phosphorus to $P_2O_5$ and of carbon monoxide to carbon dioxide in a gas stream at the top of the kiln. As the particles progress towards the reduction zone of the kiln, they are progressively heated until they reach a temperature of about 1150° C. At this temperature, elemental phosphorus commences to be liberated. The phosphorus and carbon monoxide thus evolved flow upward through the bed of free coke to the top of the rotating kiln. The free coke which has been heated to temperatures of about 1150° C. also begins to combine with any oxygen in close proximity to the bed to produce carbon monoxide. As the feed charge passes into the reduction zone of the kiln, the temperature gradually increases at the slag discharge end of the kiln to about 1400° C. Temperatures of from about 1200° C. to about 1500° C. are necessary to obtain good phosphorus elimination, depending upon the proportion of the feed ingredients. At these temperatures, phosphorus and carbon monoxide evolution takes place to substantial completion. The evolved phosphorus and carbon monoxide rise to the top of the rotating kiln in a steady upward flowing stream. Regulated amounts of air are introduced into the top of the kiln through suitable openings throughout the length of the kiln in order to oxidize the phosphorus to $P_2O_5$ and the carbon monoxide to $CO_2$. These reactions occur as follows:

$$P_4 + 5O_2 \rightarrow 2P_2O_5$$
$$2CO + O_2 \rightarrow 2CO_2$$

The above oxidation reactions have been found to supply the heat necessary to carry out the reduction of the phosphate ore. Thus, the heat requirement of the reduction step in the process is balanced by the exothermic heat evolved during the oxidation step. Little or no external heat need be added in the process other than that required for start up, depending upon the heat loss of the equipment being employed. Where heat losses require the addition of external heat, this can be supplied by introduction of a carbonaceous fuel and air at the slag-discharge end of the kiln. The products of the fuel combustion, i.e. $CO_2$ and/or $H_2O$ will function as oxidants in that they will oxidize $P_4$ to $P_2O_5$, if present in sufficient quantities.

Control of the temperature and atmosphere within the kiln is achieved by regulating the amount of air which is introduced. This is best accomplished under normal circumstances by maintaining the kiln under a partial vacuum. The oxidizing atmosphere (including excess air) which is present at the top of the kiln flows towards the feed end of the kiln in a direction opposite to the flow of the phosphorus-containing ore and free coke at the bottom of the kiln. This enables the heat which is given off during the oxidation of the phosphorus and carbon monoxide to supply the heat necessary for the phosphorus reduction and also to preheat the phosphorus-containing ore which enters at the feed entrance of the kiln. The largest amount of heat is liberated at the slag-discharge end of the kiln where phosphorus evolution is greatest and where the evolved $P_4$ and CO are available for combustion. Similarly, the greatest need for heat is at the slag-discharge end of the kiln, since complete phosphorus evolution requires large quantities of heat.

The $P_2O_5$, $CO_2$ and nitrogen, which are present in the oxidizing atmosphere are recovered from the feed end of the kiln by suitable conduits and recovery means. The $P_2O_5$ is best recovered by passing it into an aqueous solution, thereby forming phosphoric acid, or into an alkaline solution to form alkali phosphate. The spent, compacted particles which have been depleted of their phosphate values are removed from the slag-discharge end of the kiln along with the non-oxidized free coke. The free coke is separated from the slag by-product and recycled to the feed end of the kiln to repeat the cycle with fresh phosphate-containing compacted particles. The slag by-product is discharged at the slag-discharge end of the kiln as a cement clinker.

In the above-described process, the free coke serves several important functions. Initially, the free coke physically surrounds the compacted particles and prevents the oxidizing atmosphere from contacting the compacted particles and oxidizing the carbonaceous portion of the particle. The free coke also prevents the oxidizing atmosphere from contacting the compacted particles by combining with any oxygen which comes in contact with the bed. Finally, the free coke helps prevent the compacted particles from agglomerating together during the heating period within the kiln by physically separating the discrete particles of phosphate ore.

In order to illustrate the present invention, two drawings have been employed, in which FIGURE 1 represents a flow plan of the invention in block form and FIGURE 2 represents a description of the simultaneous reduction and oxidation process taking place in the kiln.

The drawings are given to illustrate one mode for carrying out the invention and are not limiting of the invention.

In this embodiment of the present invention, as illustrated in block form by FIGURE 1, a coarse phosphate ore having a particle size of about −10 mesh is treated in classifier 2 in order to remove undesirable slimes from the larger phosphate ore particles. The deslimed ore is conveyed by conduit 4 to a pulverizer 6 where the ore is reduced to −100 mesh. The pulverized ore is then passed through conduit 8 to blender 10. Alumina, silica and/or lime are added to blender 10 from an outside source through conduit 12. Pulverized slag can also be added to blender 10 through conduit 14 to supply calcium values. During the blending operation, the total $$CaO/SiO_2$$

mole ratio is adjusted to about 3:1, the free $CaO/SiO_2$ ratio is adjusted to above about 1.7:1 and the amounts of CaO and $Al_2O_3$ are adjusted to give a clinker having about 62 to 68% CaO and about 3 to 9% by weight $Al_2O_3$. The blended mass is passed through conduit 16 through a compact mill 18 where the mixture is compacted to give about a −6 +20 mesh granular product. The compacted mass is passed through conduit 20 to a screen 22 where the −6 +20 mesh particles are separated from larger-sized agglomerates. The larger agglomerates are crushed and returned to the compact mill by means not shown. The −6 +20 mesh compacted particles are then conducted through conduit 24 to a fluid bed 26. Particles are defluorinated in fluid bed 26 at temperatures of about 1050° C. to 1450° C. and hydrogen fluoride is removed from the fluid bed and passed through conduit 28 to separator 30. In separator 30, hydrogen fluoride is separated from fines and the fines recycled through conduit 32 to blender 10. The defluorinated particles are removed from the base of the fluid bed 26 and passed via conduit 34 to fluid bed coater 36. In fluid bed coater 36, the defluorinated particles are coated with carbon. The carbon may be introduced with the fluidizing gas into the fluid bed coater 36 in the form of a pulverized, low-grade coal. The fluid bed 36, which is maintained at a temperature of from about 500° C. to 1000° C., heats the coal, making it soft and tacky. The heated coal adheres to the defluorinated particles and is carbonized to a hard, adhering coating. As an alternate method, the carbon coating can be supplied by cracking methane or other hydrocarbon gas within the fluid bed coater 36. The carbon-coated particles are removed from the fluid bed coater 36 through conduit 38. The carbon-coated particles are mixed with free-coke particles 40 and passed through conduit 42 into kiln hopper 44. The phosphorus values in the feed mixture are first reduced and then oxidized in a rotary kiln 46 in a manner hereinafter described and the $P_2O_5$ is removed through conduit 48. The $P_2O_5$ gaseous mixture is passed through conduit 50 to $P_2O_5$ recovery means 52 where it is contacted with water to extract the $P_2O_5$ in the form of a phosphoric acid product 54. Slag and free coke are removed from a slag-discharge end 56 and conveyed through conduit 58 to a cooler 60. The cooled mixture is then passed through conduit 62 to a separator 64 in which the coke is separated from the slag. The separated coke is recycled through line 40 for reuse in the kiln 46. The separated slag is passed through conduit 66 to pulverizer 68. A portion of the pulverized slag from pulverizer 68 is conveyed via conduit 14 to blender 10 in order to adjust the feed ratio of the phosphate feed in blender 10. The remainder is withdrawn through conduit 70 for use as cement clinker.

In FIGURE 2, the operation of the rotary kiln is illustrated. In FIGURE 2, a rotary kiln 46, which is rotated by means of drive roller 116, has ends which terminate into air-tight, walled chambers 112 and 122. In order to accomplish the simultaneous reduction and oxidation within the kiln, the feed, which is a mixture of compacted particles and free coke, enters hopper 44 and is propelled by conveyor 106 through the entry duct 108 and into the kiln 46 to the feed end entry of the kiln 110. The compacted particles, which have been defluorinated and carbon coated, are preferably about −6 +20 mesh in size, although they may be either larger or smaller in size. When using rotary kiln 46, the free coke must be of larger particle size than the feed particles, the exact size being determined by the size of the compacted particles. When −6 +20 mesh compacted particles are employed, free-coke particles of about −3 +6 mesh have been found most suitable. A free coke to feed particle feed ratio of about 4:1 has been found to be satisfactory in a pilot rotary kiln. Lower ratios on the order of 1:1 can be employed in scaled-up commercial size kilns. The exact ratio which can be employed depends upon the depth of the bed, size of particles, etc., and is regulated so that the pellets are not subject to surfacing. Ratios which are too low are not desirable because the pellets will tend to surface and result in poor phosphorus elimination. Higher ratios can be employed but are unnecessary and undesirable since they reduce the $P_2O_5$ producing capacity of the kiln.

As the kiln slowly rotates, the free coke 128 and the compacted particles 130, which are below the surface of the free-coke bed, move towards the slag-discharge end of the kiln and are heated in pre-heating zone A. The heat is supplied by the oxidation of both phosphorus to $P_2O_5$ and carbon monoxide to carbon dioxide in the oxidizing gas stream at the top of the kiln. When the feed reaches the end of zone A and the beginning of reaction zone B, it has been heated to a temperature of about 1150° C. At this temperature, phosphorus and carbon monoxide commence to be liberated by reduction of the phosphate values in the compacted particles 130. These evolved gases flow upward through the bed of free coke 128 to the top of the rotating kiln. As the feed progresses through reaction zone B towards the slag-discharge end of the kiln, the temperature of the feed increases to about 1400° C. The maximum temperature which can be employed is limited by that temperature which causes sintering of the compacted particles. Serious sintering does not take place in this process at temperatures below about 1550° C. when using free $CaO/SiO_2$ mole ratios above 2.0:1.

At these temperatures, phosphate reduction proceeds to substantial completion and both phosphorus and carbon monoxide are evolved in a steady stream from the surface of the free-coke bed 128 throughout zone B. The phosphorus and carbon monoxide are oxidized by air introduced at the top of the kiln. The air is admitted through suitable ports 118 spaced longitudinally along the kiln. A slight excess of air is normally employed in order to assure complete combustion of the gases. The composition of the oxidizing atmosphere at the top of the kiln can be controlled by regulating the amount of air introduced through ports 118. Larger or smaller amounts of air can be admitted through each of the various ports, depending upon the amount of oxygen required for combustion at various locations in the kiln. The oxidizing stream containing phosphorus, carbon monoxide, $P_2O_5$, $CO_2$ and $N_2$ flows along the top of the kiln towards the feed end of the kiln in a countercurrent direction to the flow of the feed particles. When the oxidizing stream reaches feed end entry 110, all of the phosphorus and carbon monoxide evolved from the phosphate reduction have been oxidized to $P_2O_5$ and $CO_2$, respectively. The oxidizing stream containing $P_2O_5$, $CO_2$ and residual nitrogen passes into chamber 112 and into duct 48 where the $P_2O_5$ is recovered from the oxidizing stream.

The slag particles, free of phosphorus values, are discharged along with the free coke through the slag-discharge opening 120 into chamber 122. The slag and free coke are conveyed through a gas-sealing means 124 and discharged through conduit 56. The free coke is separated from the slag and returned to hopper 44 along with fresh phosphate-containing compacted particles.

The following example is presented by way of illustration only and is not deemed to be limiting of the present invention.

*Example I*

Florida phosphate rock containing 48.05% CaO, 32.53% $P_2O_5$, 7.83% $SiO_2$, 3.70% fluorine and 1.39% $Al_2O_3$ was deslimed by repeated washing and settling in water until the colloidal slime particles were decanted and removed. One hundred parts of this deslimed rock, 35 parts of sand ($SiO_2$), 90 parts of lime hydrate and 8.5 parts of alumina were finely ground to −150 mesh, dry blended and pelletized with water in a rolling drum. The resultant pellets were dried in a rotary drier and screened to obtain a −10 +20 mesh fraction. Four thousand grams of these pellets were placed in a fluid bed defluorinating unit. The fluid bed unit was positioned within an outer cylinder; the major heat requirement was supplied by burning propane within the annular space made up by the outer surface of the fluid bed unit and the outer cylinder. A gas stream containing excess air and propane was passed upward through the bottom of the unit to fluidize the bed at 3.5 feet per second and to supply both heat and water from the combustion of the propane. The bed was slowly heated and traces of hydrogen fluoride were evolved, commencing at temperatures of about 1050° C. Heating was continued until a maximum temperature of 1325° C. was reached. The pellets were heated for a total of about 501 minutes at temperatures above 1050° C. A total of 3294 grams of −10 +20 mesh pellets was recovered in which substantially all of the fluorine was eliminated. These pellets were then placed in a 4 inch I.D. fluid bed coater. The fluid bed coating apparatus was positioned within an outer cylinder; heating was accomplished by burning propane within the annular space made up by the outer surface of the fluid bed coater and the outer cylinder. Nitrogen was passed into the base of the fluid bed coater at a rate of 4.7 s.c.f.m. and the temperature of the bed was raised to about 850° C. Pulverized, soft coal (−150 mesh) was fed into the base of the fluid bed coater at a rate of 6.5 grams per minute for a total of 90 minutes. Thereafter, the coater was shut down, the pellets were cooled and were analyzed. The pellets contained 14.95% $P_2O_5$, 53.0% CaO, 19.03% $SiO_2$, 4.63% $Al_2O_3$ and only trace amounts of fluorine.

A charge was made up containing 1500 grams of the −10 +20 mesh coated defluorinated pellets and 6000 grams of −3 +6 mesh coke. A pilot plant rotary kiln having a diameter of 28 inches and containing an initial bed of coke was preheated by internal firing with an air-propane mixture until the coke particles reached a temperature of 1425° C. at the slag-discharge end of the kiln. The charge was added to the preheated kiln at a rate of 50 grams per minute. The kiln was internally fired with the air-propane mixture and the feed charge was brought up to a final temperature of about 1425° C. The kiln was rotated at a rate of 0.33 r.p.m. Air was introduced into the kiln at a rate of 33.8 s.c.f.m. at 70° F. and 760 mm. of Hg. Phosphorus evolution was continuous throughout the run. After the entire charge was added to the kiln, coke was added continuously at 50 grams per minute to flush out all of the pellets in the kiln. The feed was subjected to temperatures of over 1325° C., but no higher than 1425° C., for a total of 300 minutes during its travel through the kiln; thereafter, the kiln was shut down. During the run, the overhead gases which passed countercurrently to the flow of the feed were removed from the kiln and upon analysis were found to contain $P_2O_5$. Phosphorus elimination from the pellets and conversion to $P_2O_5$ was 89% of the phosphorus charged. The slag which was obtained from the opposite end of the kiln was analyzed and found to contain 66.9% CaO, 24.1% $SiO_2$, 5.84% $Al_2O_3$ and 1.6% $P_2O_5$. This slag is employed as a clinker for producing Portland cement. When the slag was ground to Portland cement fineness and properly formulated, it gave a cement which met all specifications.

The above example was repeated with the addition of 6.25 parts of soda ash (−150 mesh) to the feed mixture before it was pelletized. It was found that defluorination proceeded more rapidly and readily in the defluorinator. Other than the above, the results obtained were identical with the above example.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for recovering phosphorus values and a calcium silicate cement clinker from a phosphatic ore which comprises
    (a) introducing about a −10 mesh phosphatic ore into a desliming classifier,
    (b) water washing −10 mesh phosphate ore to remove small colloidal particles below about 5 microns containing low fusion point impurities as slimes from the phosphate-containing particles,
    (c) mixing the deslimed phosphate ore with alumina, silica and crushed lime to produce a mixture having
        (1) a free $CaO/SiO_2$ mole ratio of above about 1.70:1,
        (2) a total $CaO/SiO_2$ mole ratio of about 3:1,
        (3) lime in sufficient amounts to yield a CaO content in the final clinker product of about 62 to 68% by weight of the clinker and
        (4) alumina in amounts to give a total $Al_2O_3$ content in the final clinker product of about 3 to 9% by weight of the clinker,
    (d) compacting said mixture to form discrete particles,
    (e) heating said compacted particles in a heating zone at temperatures of about 1050° C. to about 1500° C. in the presence of steam, whereby fluoride values are removed,
    (f) adding carbon to said defluorinated compacted particles in at least stoichiometric quantities to reduce the phosphorus values present in the compacted particles,
    (g) passing said carbon-containing compacted particles into a heating zone and heating said particles to from about 1200° C. to 1500° C. whereby carbon monoxide and elemental phosphorus are evolved,
    (h) recovering the phosphorus thus evolved, and
    (i) recovering a cement clinker having a total $CaO/SiO_2$ mole ratio of about 3:1.

2. Process of claim 1 wherein said feed is heated to about 1250° C. to 1450° C. in the initial heating zone to remove fluoride values.

3. Process of claim 1 where said defluorination is carried out in a fluid bed.

4. Process of claim 1 where a portion of calcium silicate recovered in step (i) as cement clinker is recycled and added to said deslimed phosphatic ore to supply the calcium and silicon dioxide necessary to produce free $CaO/SiO_2$ mole ratios of above about 1.70:1.

5. A process for recovering phosphorus values and a calcium silicate cement clinker from a phosphatic ore which comprises
    (a) introducing about a −10 mesh phosphatic ore into a desliming classifier,
    (b) water washing −10 mesh phosphate ore to remove small colloidal particles below about 5 microns containing low fusion point impurities as slimes from the phosphate-containing particles,
    (c) mixing the deslimed phosphate ore with alumina, silica, crushed lime and soda ash to produce a mixture having
        (1) a free $CaO/SiO_2$ mole ratio of above about 1.70:1,
        (2) a total $CaO/SiO_2$ mole ratio of about 3:1,
        (3) lime in amounts to give a total CaO content in the final clinker product of about 62 to 68% by weight of the clinker,
        (4) alumina in amounts to give a total $Al_2O_3$ content in the final clinker product of about 3 to 9% by weight of the clinker, and
        (5) sodium carbonate in amounts of about 3 to 8% by weight of said mixture,
    (d) compacting said mixture to form discrete particles,
    (e) heating said compacted particles in a heating zone at temperatures of about 1050° C. to about 1500° C.

in the presence of steam, whereby fluoride values are removed, (f) adding carbon to said defluorinated compacted particles in at least stoichiometric quantities to reduce the phosphate values present in the compacted particles, (g) passing said carbon-containing compacted particles into a heating zone along with discrete coke particles, (h) maintaining said compacted particles beneath the upper surface of a bed of said discrete coke particles, (i) heating said compacted particles and said discrete coke particles in said heating zone to from about 1200° C. to 1500° C. whereby carbon monoxide and elemental phosphorus are evolved, (j) introducing air into said heating zone, (k) oxidizing said phosphorus and carbon monoxide as they are evolved to $P_2O_5$ and $CO_2$ respectively in the presence of said feed mixture of particles, (l) passing said oxidizing stream containing $P_2O_5$ and $CO_2$ countercurrently to the flow of said compacted particles and discrete particles whereby the exothermic heat evolved during said oxidation is used to heat said incoming compacted particles and discrete coke particles to said 1200° C. to 1500° C. and to supply the necessary endothermic heat of reduction required for said phosphorus evolution, (m) recovering said $P_2O_5$ from one end of said heating zone and (n) recovering a cement clinker having a total $CaO/SiO_2$ mole ratio of about 3:1 from the opposite end of said heating zone.

6. Process of claim 5 where said feed is heated to about 1250° C. to about 1450° C. in the initial heating zone to remove fluoride values.

7. Process of claim 5 in which a portion of calcium silicate recovered in step (n) as cement clinker is recycled for blending and added to said deslimed phosphatic ore to supply the calcium values necessary to produce free $CaO/SiO_2$ mole ratios of above about 1.70:1.

References Cited by the Examiner

UNITED STATES PATENTS

| | | | |
|---|---|---|---|
| 1,242,987 | 10/1917 | Schmitz | 23—165 |
| 1,630,283 | 5/1927 | Waggaman et al. | 23—165 |
| 1,870,602 | 8/1932 | Case | 23—165 X |
| 2,360,197 | 10/1944 | Butt | 23—108 X |
| 2,446,978 | 8/1948 | Maust | 71—47 |
| 2,478,200 | 8/1949 | Maust et al. | 23—108 X |

MAURICE A. BRINDISI, *Primary Examiner.*